United States Patent
Hasharoni et al.

(10) Patent No.: US 11,249,306 B2
(45) Date of Patent: *Feb. 15, 2022

(54) SYSTEM AND METHOD FOR PROVIDING SYNTHETIC INFORMATION ON A SEE-THROUGH DEVICE

(71) Applicant: Elbit Systems Ltd., Haifa (IL)

(72) Inventors: Omer Hasharoni, Haifa (IL); Itamar Nocham, Haifa (IL)

(73) Assignee: Elbit Systems Ltd., Haifa (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/182,306

(22) Filed: Feb. 23, 2021

(65) Prior Publication Data

US 2021/0199961 A1 Jul. 1, 2021

Related U.S. Application Data

(63) Continuation of application No. 16/767,122, filed as application No. PCT/IL2018/051295 on Nov. 27, 2018, now Pat. No. 10,935,785.

(30) Foreign Application Priority Data

Nov. 27, 2017 (IL) .......................................... 255955

(51) Int. Cl.
*G02B 27/00* (2006.01)
*G02B 27/01* (2006.01)

(52) U.S. Cl.
CPC ..... *G02B 27/0093* (2013.01); *G02B 27/0172* (2013.01); *G02B 2027/014* (2013.01);
(Continued)

(58) Field of Classification Search
CPC ............ G02B 27/0093; G02B 27/0138; G02B 27/017; G02B 27/0172; G02B 27/0187; G02B 2027/014

See application file for complete search history.

(56) References Cited

U.S. PATENT DOCUMENTS 9,035,874 B1 * 5/2015 Fowers ................. G06F 3/0482
345/156
9,269,239 B1 2/2016 Jensen et al.
(Continued)

FOREIGN PATENT DOCUMENTS

KR 20170044451 4/2017
WO WO 2013/049248 4/2013

OTHER PUBLICATIONS

Extended European Search Report for EP Patent Application No. 18881041 dated Jul. 9, 2021.
(Continued)

*Primary Examiner* — Ryan A Lubit
(74) *Attorney, Agent, or Firm* — Pearl Cohen Zedek Latzer Baratz LLP

(57) ABSTRACT

A method and a system for displaying conformal synthetic data on a scene over a head-mounted see-through display (HMSTD) having a line of sight (LOS) are provided herein. The system may include: a tracker configured to track the LOS of the HMSTD; a display controller configured to display on the HMSTD a first display area comprising a synthetic image data conformal to a scene viewed from the HMSTD; wherein said display controller is configured to receive a desired point being a point within the scene which intersects the LOS of the HMSTD and to display a second display area on said HMSTD, wherein the second display area is positioned relative to said desired point, wherein said synthetic image data is displayed over the HMSTD at a reduced intensity on an overlap area between the first and the second areas.

20 Claims, 12 Drawing Sheets

(52) U.S. Cl.
CPC ................ *G02B 2027/0138* (2013.01); *G02B 2027/0187* (2013.01)

(56) References Cited

U.S. PATENT DOCUMENTS

| | | |
|---|---|---|
| 2010/0231705 A1 | 9/2010 | Yahav et al. |
| 2014/0253605 A1* | 9/2014 | Border ................ G02B 27/017 345/690 |
| 2016/0054567 A1* | 2/2016 | Kim ...................... H04L 65/403 345/8 |
| 2016/0109957 A1* | 4/2016 | Takashima .............. G06F 3/011 345/8 |
| 2016/0217327 A1* | 7/2016 | Osterhout ........ H04N 5/232945 |
| 2017/0113641 A1* | 4/2017 | Thieberger .............. B60R 21/04 |
| 2017/0329141 A1* | 11/2017 | Border ............... G02B 27/0172 |

OTHER PUBLICATIONS

Gloria L. Calhoun A. et al. "Synthetic vision system for improving unmanned aerial vehicle operator situation awareness"; Proc. SPIE, Enhanced and Synthetic Vision 2005, vol. 5802, pp. 219-230, May 1, 2005.

International Search Report for PCT Application No. PCT/IL2018/051295, dated Mar. 18, 2019.

Notice of Allowance issued for U.S. Appl. No. 16/767,122, dated Nov. 10, 2020.

* cited by examiner

BASIC HIGH LEVEL SYSTEM

SYSTEM AND METHOD FOR PROVIDING SYNTHETIC INFORMATION ON A SEE-THROUGH DEVICE

CROSS REFERENCE TO RELATED APPLICATIONS

This application is a continuation of patent application Ser. No. 16/767,122, filed on May 27, 2020, which is a US national phase of PCI international Patent Application No. PCT/IL2018/051295, filed on Nov. 27, 2018, which claimed the benefit of Israeli Patent Application No. 255955, filed Nov. 27, 2017, all of which are incorporated herein by reference in their entireties.

FIELD OF THE INVENTION

The present invention relates generally to the field of head-mounted display and more particularly to synthetic data applied on same.

BACKGROUND OF THE INVENTION

Prior to the background of the invention being set forth, it may be helpful to provide definitions of certain terms that will be used hereinafter.

The terms "head-mounted display" and "helmet-mounted display" both abbreviated HMD as used herein is defined as a display device, worn on the head or as part of a helmet, that has a small display optic in front of one (monocular HMD) or each eye (binocular HMD). HMD has many uses including in gaming, aviation, engineering, and medicine. There is also an optical head-mounted display (OHMD), which is a wearable display that can reflect projected images and allows a user to see through it.

The term "synthetic vision system" (SVS) as used herein is defined as computer-mediated reality system for aerial vehicles, that uses 3D to provide pilots with clear and intuitive means of understanding their flying environment. Synthetic vision provides situational awareness to the operators by using terrain, obstacle, geo-political, hydrological and other databases. A typical SVS application uses a set of databases stored on board the aircraft, an image generator computer, and a display. Navigation solution is obtained through the use of GPS and inertial reference systems.

Current HMD with SVS capability are known are used to provide a user with at least one region of interest within the scene in which the information displayed will be of a synthetic source or otherwise processed. However current HMD with SVS capability are very limited when it comes to tailoring the SVS portion to the needs of the pilot and so cannot address use cases when it would be better from mission perspective, to remove or change some of the SVS data in at least some of the portion it has been applied.

BRIEF SUMMARY OF THE INVENTION

Some embodiments of the present invention provide a system for displaying a combined image data from several sources on a head-mounted see-through display (HMSTD) defining a line of sight (LOS), the system comprising: a tracker configured to track the LOS of the HMSTD; a display controller configured to display on the HMSTD a first display area comprising a synthetic image data conformal to a scene viewed from the HMSTD; a trigger mechanism configured to select a desired point being a point within the scene which intersects the LOS of the HMSTD at a time of a triggering event, wherein said display controller is configured to receive said desired point and to display a second display area on said HMSTD, wherein the second display area is positioned relative to said desired point, and wherein said display controller is further configured to perform alteration to the synthetic image data in a portion of the first display area covered by the second display area.

BRIEF DESCRIPTION OF THE DRAWINGS

For a better understanding of the invention and in order to show how it may be implemented, references are made, purely by way of example, to the accompanying drawings in which like numerals designate corresponding elements or sections. In the accompanying drawings.

DETAILED DESCRIPTION OF THE INVENTION

Embodiments disclosed herein relate to devices, systems and methods for displaying information to a user and which may be configured to display synthetic data and at least one sensor data with relation to a desired point indicated by a head-mounted see-through display line of sight relative to an outside scene, the monitoring and/or controlling of the display using the line of sight improves situation awareness and/or better capabilities to control different area of the display.

The following description of the display devices, systems and methods is given with reference to particular examples, with the understanding that such devices, systems and methods are not limited to these examples.

Figure 1A:
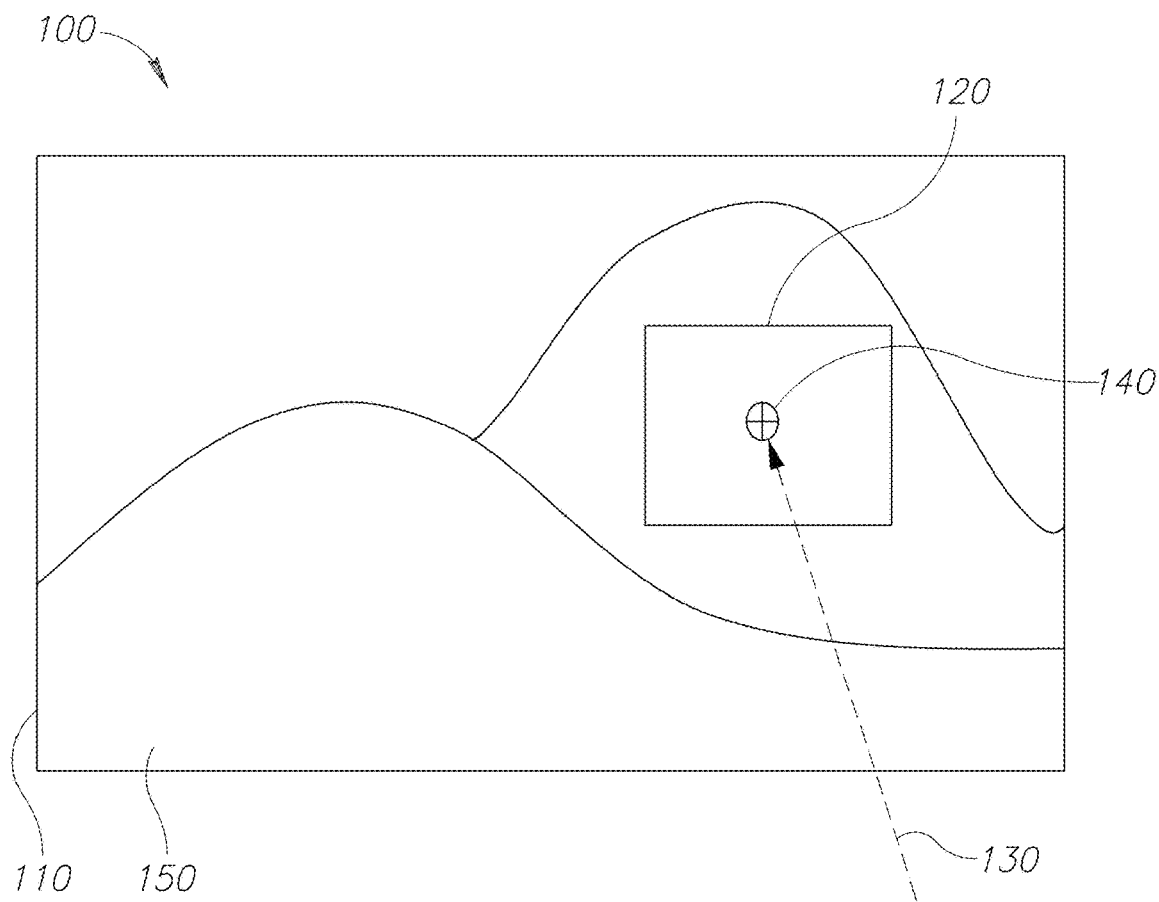
FIGS. 1A, 1B, 1C are high level schematic illustrations of use scenarios, according to some embodiments of the invention.
Figure 1B:
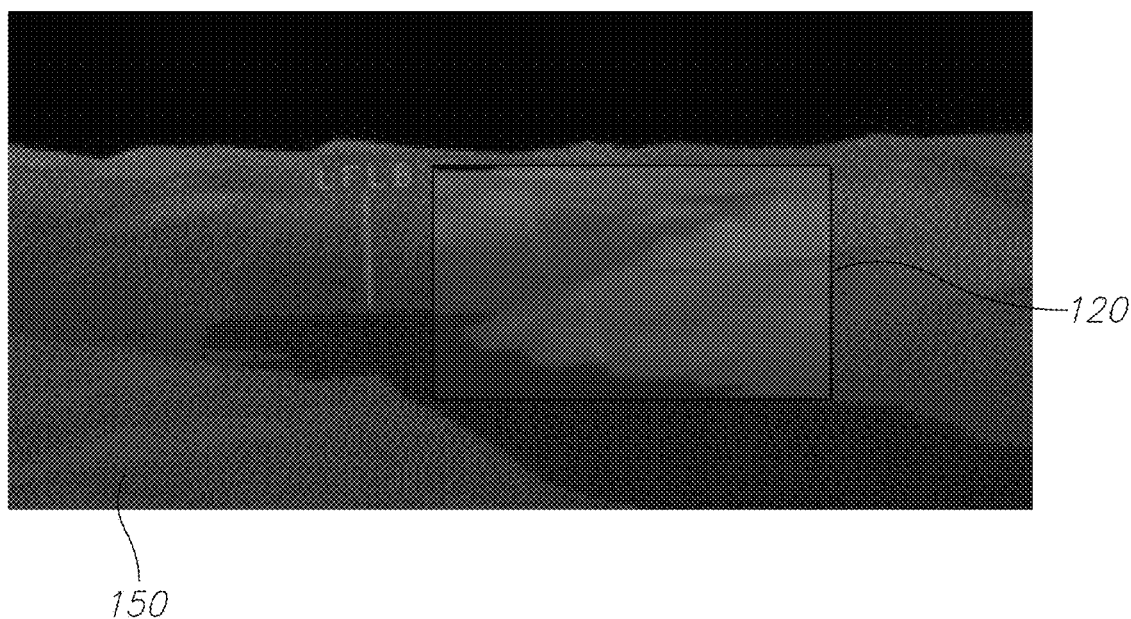

Referring now to FIGS. 1A and 1B, a head-mounted see-through display (HMSTD) 100 may display a synthetic data 150 overlaid conformal on an outside scene in a first display area 110, the HMSTD line of sight 130 (LOS) may be tracked using a tracker arrangement. The tracker arrangement may be selected from a list of know trackers such as: optical tracker, magnetic tracker, inertial tracker and/or hybridization of such trackers. The HMSTD line of sight 130 vector is directed towards the outside scene and intersects the terrain data and may indicate a desired point 140 located along line of sight 130. A Display controller is adapted to receive the HMSTD LOS 130 and the desired point 140 and according to predefined rules is further configured to define a second display area 120 which may be partially or fully contained within the first display area 110. The second display area may be configured to display another data (not conformal synthetic data) derived from several sources such as (but not limited) sensor data observing the scene, the sensor data could be selected from a plurality of sensors cropped and rendered according to the HMSTD LOS 130, the other data may be a "hole" in the synthetic data allowing to view the actual scene behind the synthetic data. The synthetic data 150 may show different layers of data such as: obstacle data, runway, terrain elevation map, rivers, roads and more. The synthetic data 150 may be stored on a remote location, on the platform or in the HMSTD. The synthetic data could be selected according to user definitions or automatically selected according to distance from HMSTD location and/or according to a HMSTD route of navigation. The HMSTD may be mounted on platform such as an aircraft or other vehicle. The synthetic data 150 is further configured to be displayed in a conformal manner according to the HMSTD position and orientation relative to the scene.

FIG. 1B is one example of a second display area 120 displaying a sensor data inside the first display area 110 displaying a conformal synthetic data on an outside scene, according to a HMSTD LOS 130 and desired point 140, the pre-defined rules and the triggering mechanism. The second display area 120 may display a sensor data by altering intensity of the first display area 110 covered fully or partially by the second display area 120. The altering may be a reduction of the intensity.

Figure 1C:
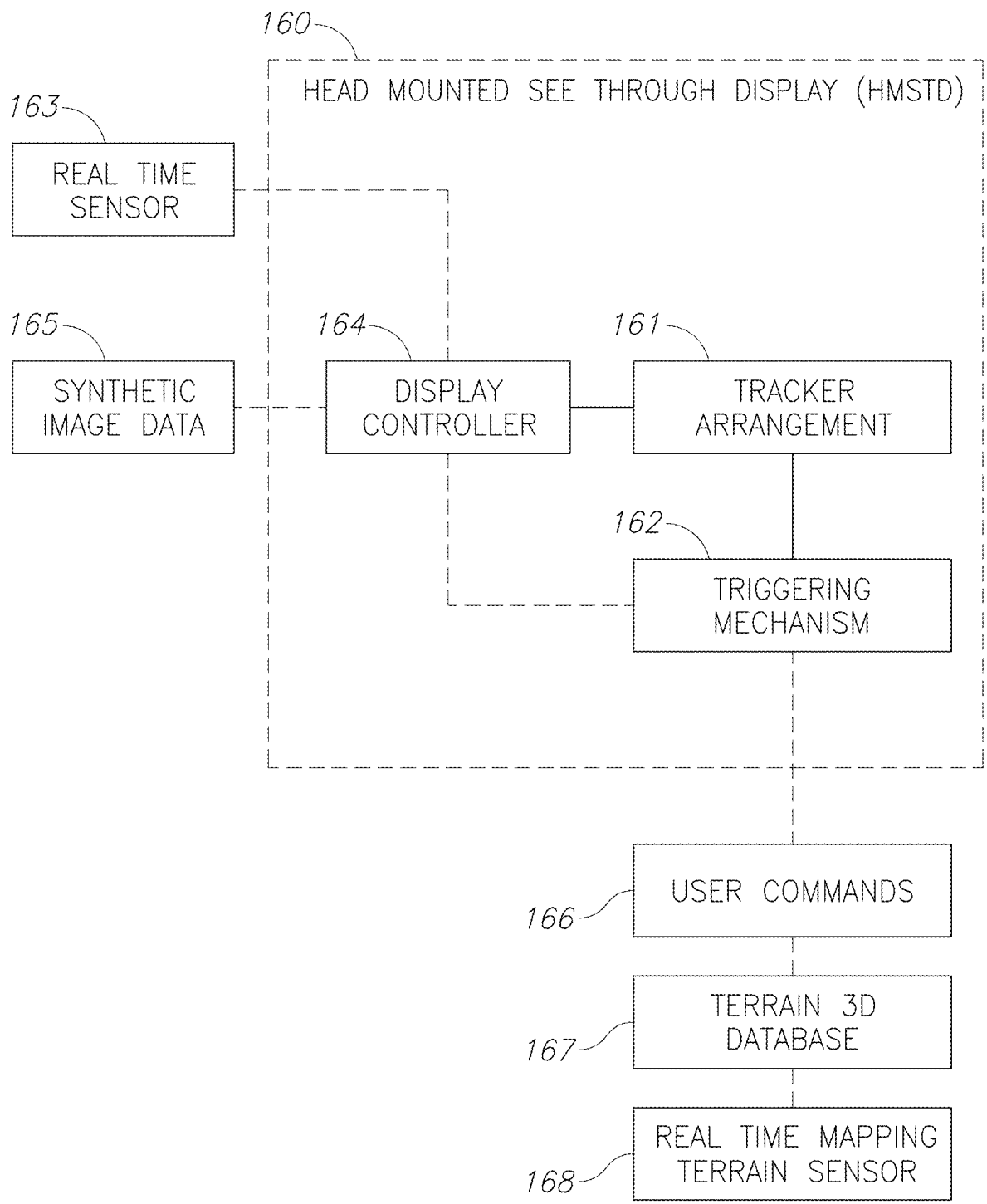

Referring to FIG. 1C is a high level schematic block diagram of a head-mounted see-through display device 160 (HMSTD), according to one embodiment of the invention wherein display controller 164 is adapted to manage data to be displayed on HMSTD 160. Tracker arrangement 161 is configured to track HMSTD 160 line of sight in earth coordinates, the LOS in earth coordinates could be derived directly from the HMSTD 160 using tracker arrangement 161 or in case mounted on a moving platform could be derived by tracking the platform position and orientation (using platform INS, GPS and other sensors mounted on platform), tracking the HMSTD relative to the moving platform and by subtracting the platform pose data further derive HMSTD 160 position and orientation in earth coordinates. Synthetic data 165 is displayed on HMSTD 160 in a first display area overlaid conformal on an outside scene according to HMSTD line of sight as tracked in earth coordinate. Synthetic data 165 may be stored locally on HMSTD 160 or on a remote server. Triggering mechanism 162 receives HMSTD 160 LOS and may further be adapted to indicate a desired point on the outside scene based on HMSTD 160 LOS and a triggering event. In some cases the HMSTD may be mounted on a user walking in a street, the HMSTD may display information overlaid conformal on the outside scene in the first display area. The user may select a desired point on the outside scene and according to pre-defined rules a second display area may be generated and in the second display area the system may provide/project information derived from several sources, such as but not limited to: sensor data, augmented reality, navigation data, obstacle data. The desired point may be selected using the HMSTD line of sight (LOS) traveling on the outside scene and viewed by the user through the HMSTD. The HMSTD LOS and a triggering event may generate a desired point. The second display area is placed in relative position to the desired point.

The triggering event may be any of the list but not limited to: time threshold—when the HMSTD is pointing using the tracked LOS on the outside scene above a predefined time threshold (e.g. above 5 seconds) a desired point will be generated, tactile event—when the HMSTD is pointing using the tracked LOS on the outside scene and with combination of a user command 166 tactile event may generate a desired point, voice command—when the HMSTD is pointing using the tracked LOS on the outside scene and with combination of a voice command indicated by user command 166 may generate a desired point on the outside scene, known/predefined object in scene—when the HMSTD is pointing using the tracked LOS on the outside scene on a specific object derived from a terrain data either terrain 3D database 167 or real time mapping terrain sensor 168, both indications HMSTD LOS and known object in the scene may generate a desired point on the outside scene. An image correlation may be used to indicate a desired object is viewed by the HMSTD and perform as a triggering event for a desired point. All of the options above indicating triggering events may be used independently or in combination.

Display controller 164 receives at least one desired point on the outside scene and with predefined rules defines a second display area on the HMSTD 160 positioned relative to the desired point. Display controller 164 receives at least one real time sensor 163 data to be displayed is the second display area, the sensor 163 data could be a sensor coupled to the system or to a remote sensor to the system, the sensor 163 may be coupled to a moving platform or to a stationary device. Sensor 163 may be coupled to an airborne platform, land vehicle, a person, unmanned vehicles and other moving platforms. The sensor 163 may be coupled to a stationary sighting device. Sensor 163 may be any real-time sensor viewing at least part of the outside scene viewed by the HMSTD 160. Display controller 164 may crop data from sensor 163, render the data according to the HMSTD 160 LOS and displaying the sensor 163 data in the second display area. Sensor 163 may be any sensor such as: thermal, vision systems, PMMW, LIDAR and others.

HMSTD 160 is further configured to display at least two different display areas simultaneously such that the first display area contains a synthetic conformal data 165 and the second display area contains other data such as a real time sensor 163 data corresponding to the desired point indicated by the HMSTD 160 LOS and predefined rules. The display controller is further configured to perform alteration to the synthetic image data in a portion of the first display area covered by the second display area.

Figure 2:
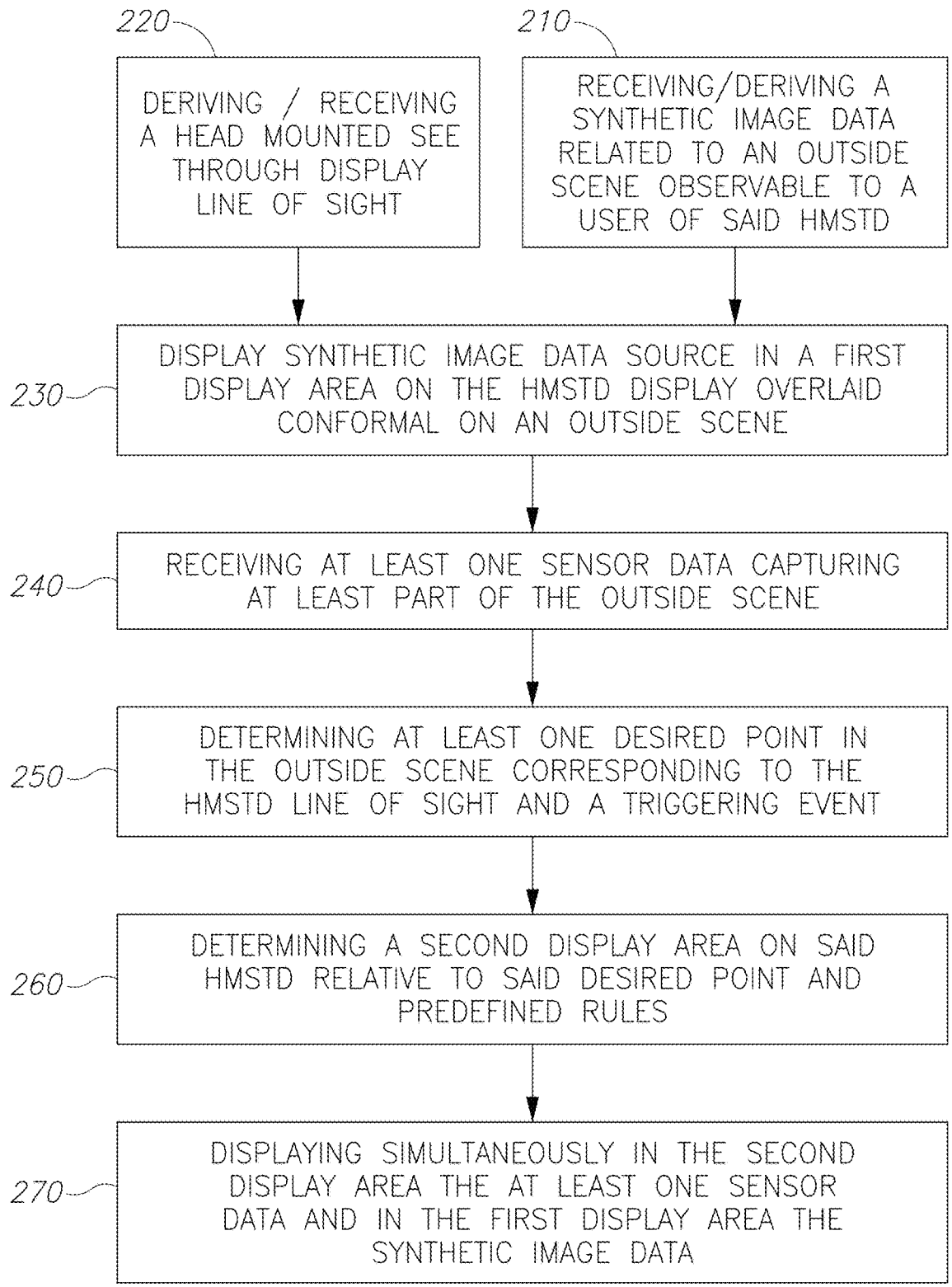
FIG. 2 is a high-level flowchart illustrating a method, according to some embodiments of the invention.

FIG. 2 is a high-level flowchart illustrating a method 200, according to some embodiments of the invention. Data processing stages of method 200 may be carried out at least partially by at least one processor.

Method 200 may display a combined image data sources on a head-mounted see-through display (HMSTD) to be controlled by HMSTD line of sight and may comprise receiving or deriving a HMSTD line of sight (stage 220), the line of sight may be calculated by the HMSTD tracking arrangement or a remote tracker indicating the HMSTD position and orientation with respect to earth coordinates or platform coordinates. The tracking arrangement may be part of the HMSTD such as inertial measurement unit (IMU), magnetic tracker, optical tracker and others indicating the position and/or orientation of the HMSTD in earth coordinates or relative to a moving platform. The tracker arrangement may be a remote tracker to the HMSTD such as an optical tracker viewing the HMSTD and indicating using a real time sensor the HMSTD position and orientation thus deriving HMSTD LOS. Method 200 further comprises receiving or deriving a synthetic image data related to an outside scene observable to a user of said HMSTD (stage 210), the Synthetic data may be stored on the device or on a remote server, the synthetic data could be derived from a real time sensor mapping the outside scene and rendered to serve as a synthetic data.

The synthetic data displayed on the HMSTD may be only a part of data related only to the outside scene viewable by the HMSTD the relevant partial data of the synthetic data is derived (thereby reducing the amount of data needed) according to at least one of: HMSTD location-using the location of the HMSTD to derive the synthetic data needed to the specific HMSTD, HMSTD LOS—using the line of sight to derive the synthetic data needed to a specific view of the HMSTD, HMSTD velocity vector—using the heading vector of the HMSTD to indicate the predicted path of the HMSTD and to derive in advance a part of synthetic data relevant to the future path, HMSTD navigation path—derive part of synthetic data according to the navigation path of the HMSTD, HMSTD predefined objects—derive part of synthetic data according to predefined objects, e.g., user is only interested in layer of obstacle data to be displayed conformal on the outside scene.

Method 200 further comprises receiving or deriving at least one sensor data capturing at least part of the outside scene observable to a user of said HMSTD (stage 240), the sensor data may derive from local sensor coupled to the HMSTD, sensor coupled to a platform associated with HMSTD, or a remote sensor detached from the HMSTD or the platform associated with the HMSTD (e.g., remote UAV viewing the outside scene).

Method 200 further comprises determining at least one desired point in the outside scene based on LOS derived in stage 220 and triggering event (stage 250). The desired point on the outside scene may be indicated using the HMSTD LOS and with triggering event such as indicated above in FIG. 1C, the desired point may indicate the user wish to remove at least partially the conformal synthetic data overlaying the outside scene such that a "hole" (the second display area) will be generated (stage 260) on the HMSTD that will allow placing other data such as a real time sensor data or to remove the synthetic data in the second display area. The size and shape of the second displayed area is associated with the HMSTD line of sight and predefined rules, detailed examples of how to derive characteristics of the second area will be detailed in FIGS. 3, 4, and 5.

Method 200 further comprises displaying simultaneously in the second display area the at least one sensor data and in the first display area the synthetic image data conformal on the outside scene (stage 270), the at least one sensor data may be placed in the second display area in a manner that aligns and conforms with the synthetic data such that the synthetic data will be displayed conformal on the outside scene and will increase situation awareness of the user and by additionally placing a real time sensor in the second display area may allow the user to see a point and/or area of interest in the outside scene indicated by the HMSTD LOS and predefined rules. Method 200 may further comprise alteration to the synthetic image data in a portion of the first display area covered by the second display area. The alteration of the first display area may be achieved by changing the intensity of the first display area (reduce intensity or increased intensity), the reduction of the intensity may create a "hole" inside the first display area such that the outside world may be seen directly through it (through the "hole"). The alteration of the first display area may be done by changing the synthetic data stream from the controller to the area of first display area covered by the second display area such that the data steam may not contain any information and therefore may generate the "hole", it is understood that many other options are available to alter the first display area such that additional information may be displayed in the second display area (indicated by the HMSTD LOS). Projecting a data in the second display area such as: projection of HMSTD sensor data, projection of a remote sensor data not coupled to the HMD, direct view of the scenery as can be seen through the hole, projection of augmented information. The altering or modifying may be done in a dynamic way such that the second display area may follow the HMSTD LOS or fixed to a spatial position indicated by the desired point. Projecting may include different ways to display the other data in the second display area (waveguide, LCD and another near eye display).

Figure 3A:
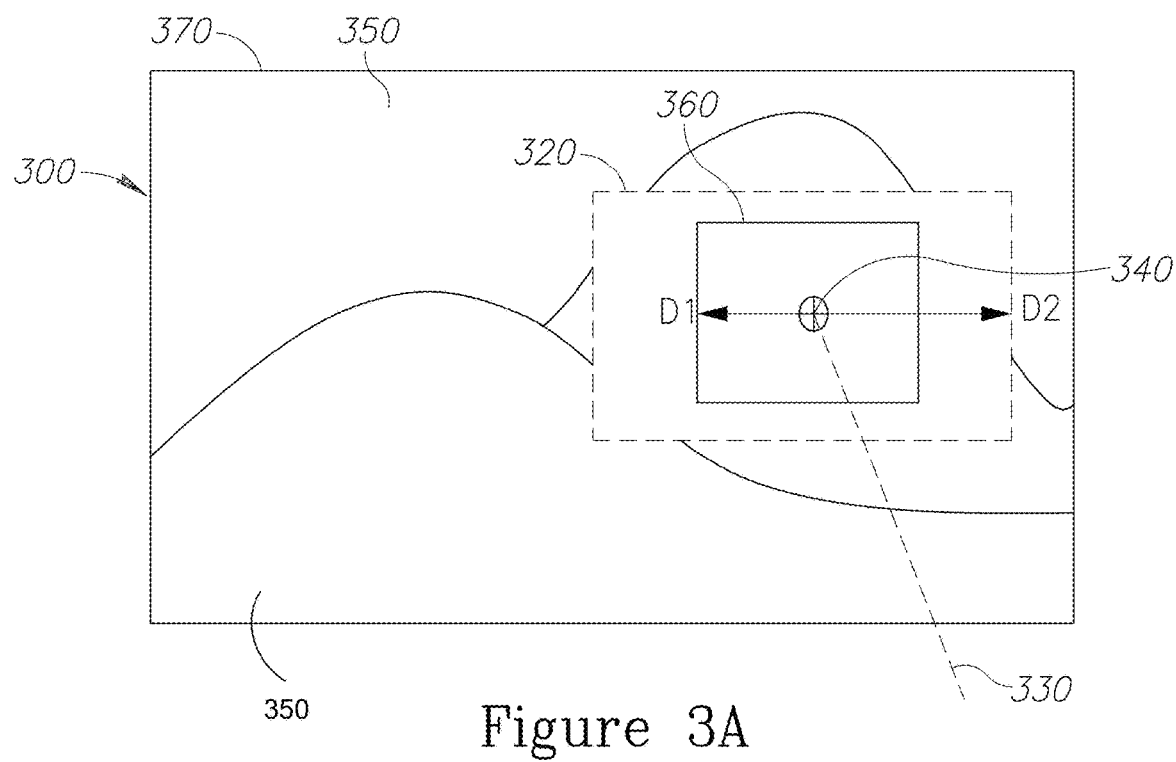
FIGS. 3A and 3B are high level schematic illustrations of use scenarios, according to some embodiments of the invention.
Figure 3B:
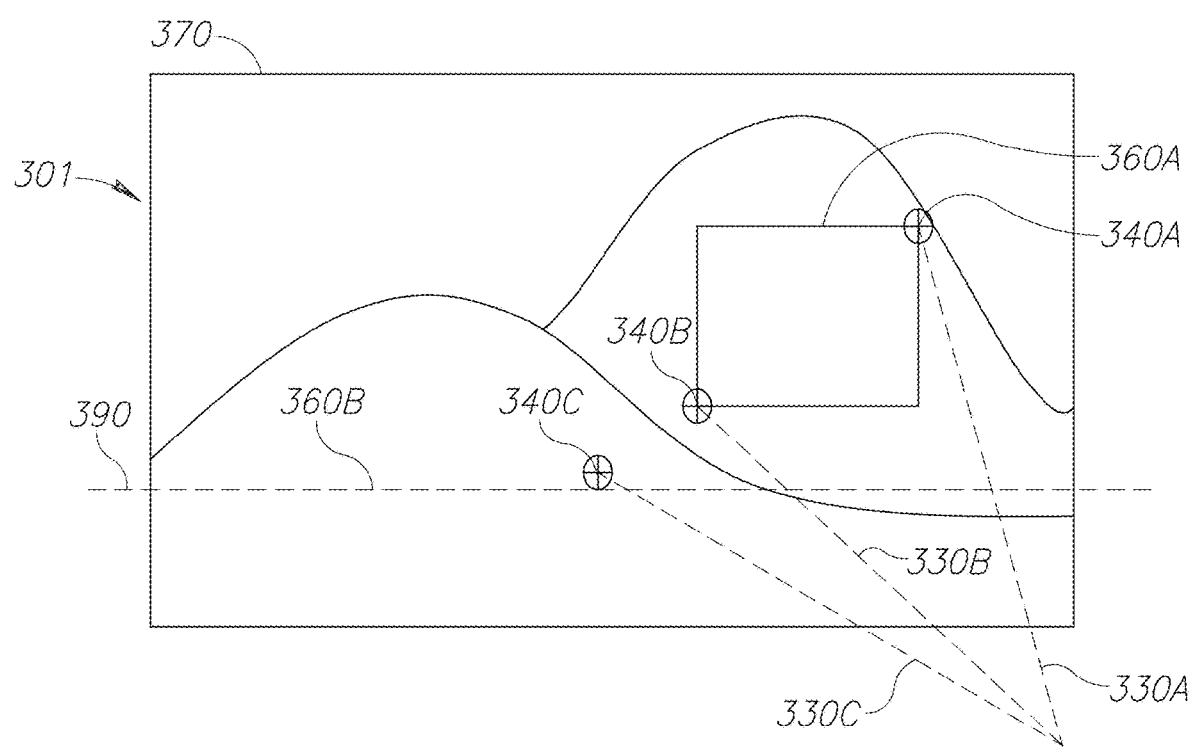

FIGS. 3A and 3B are high level schematic illustrations of use scenarios, according to some embodiments of the invention. FIGS. 3A and 3B illustrate schematically configurations and predefined rules for deriving a second displayed area on the HMSTD using the line of sight and predefined rules. Display 300 of HMSTD according to one embodiment of the invention displays a synthetic data 350 overlaid conformal on the outside scene in a first display area 370, the outside scene is viewable by a user of the HMSTD. Tracking the HMSTD LOS 330 and using a terrain 3D data of the outside scene may further allow indicate at least one desired point 340 on the outside scene.

The desired point 340 indicates the user wish to derive a second display area 360 on the HMSTD, the size, shape, location and behavior of the second display area 360 are associated with the desired point 340 and predefined rules. The size of second display area 360 may be according to predefined distance from the center of the desired point 340 such as D1 or D2, using D1 as the predefined distance will derive second display area 360 size, using D2 as the predefined distance will derive second display area in the size of area 320. It is understood that the shape of the second display area could be circle, rectangle, square and other shape preferred by the HMSTD user. The shape and size of the second display area 360 may be related and decided automatically according to the sensor's capabilities such as field of view, resolution, stabilization, moving or stationary, speed of the sensor movement. The predefined rules may indicate that desired point 340 is defining the center of the second display area, the corner or the edge of the second display area. The predefined rules may indicate that desired point 340 can indicate a second display area using one desired point only. Predefined rules may include real time sensor data priorities when a plurality of sensors is available to display in the second display area. The rate of changes in the HMSTD LOS 330 may indicate to the system that the user is moving the HMSTD rapidly or slowly and by knowing the current rate of movements the system may adapt the parameters of the second display area 360 (size, location, and shape).

Referring to FIG. 3B in this use scenario according to another embodiment of the invention the second display area is derived by using at least two desired points 340A and 340B together with predefined rules indicating the size and shape the second display area. A further embodiment may indicate using one desired point 340C and LOS 330C to generate a second display area 360B such that desired point 340C will split the first display area 370 vertically or horizontally (i.e., line 390) associated with desired point 340C. Line 390 splits the first display area 370 to two display areas, it is understood that using this method one can generate two or more display areas which may be in different size, location and orientation.

Figure 4A:
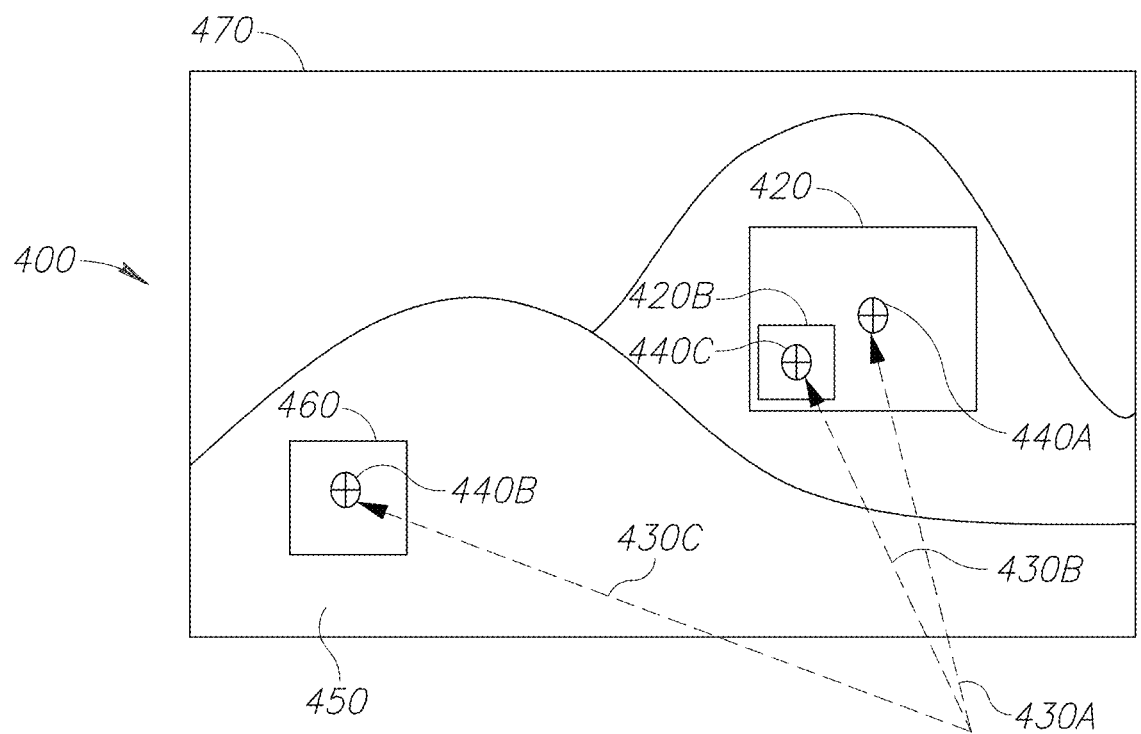
FIGS. 4A and 4B are high level schematic illustrations of use scenarios, according to some embodiments of the invention.

Referring to FIG. 4A illustrating a use scenario according to another embodiment of the invention, the first display area 470 may display using the HMSTD a synthetic data overplayed conformal on the background scene 450, HMSTD LOS 430A may indicate a desired point 440A on the outside scene 450 which in turn may generate a second display area 420 configured to display at least one sensor data within the second display area 420, By repeating the scenario with different HMSTD LOS 430C and a second desired point 440B a third display area 460 may be generated and may display at least one sensor data, it is understood that these steps may be repeated in order to generate a plurality of different display area located in different spatial position on the first display area 470, the plurality of display area (420, 460) may display the same sensor data or different data derived from different sensors.

In another embodiment HMSTD LOS 430B may indicate a desired point inside second display area 420, this may generate a forth display area 420B inside 420 which is able to display a different sensor data from the sensor data displayed inside second display area 420. This scenario allows to generate using plurality of HMSTD LOS more than one display area within a display area with different data streams from a plurality of sensors. Display area 420B may be locked spatially to the position as indicated by desired point 440C or it may be movable such that it may follow the HMSTD actual LOS (the actual HMSTD LOS is the most updated LOS as tracked by the tracker arrangement and indicates the HMSTD LOS either in the vehicle coordinates system or earth related coordinates system) display area 420B may move according to predefined rules only inside the boundaries of display area 420 or may follow the actual HMSTD LOS on entire display area 420. Display area 420, 460, 420B are illustrated in the different figures in one specific shape and size for the sake of clarity it is understood that the shape, size, boundaries and other parameters of the different display areas may vary according to predefined rules and preferences of the user of the HMSTD.

Figure 4B:
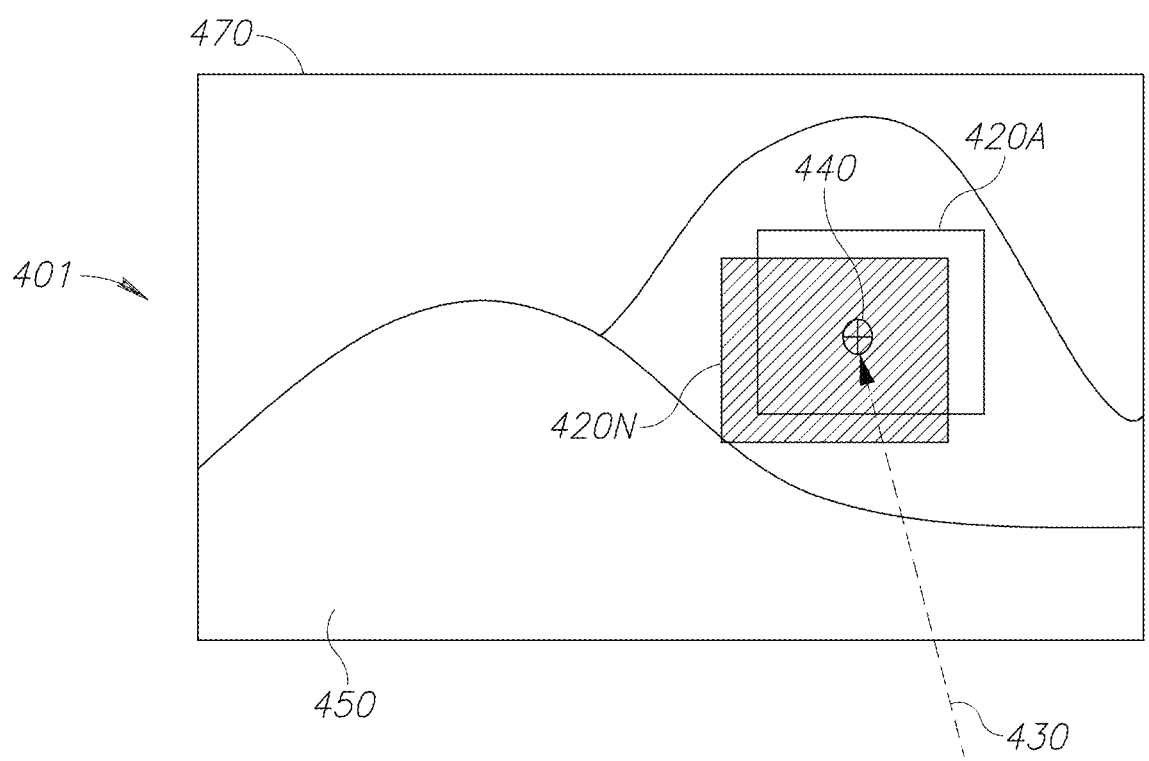

FIG. 4B illustrate another embodiment of the invention where plurality of display areas 420A to 420N may contain a different sensor data, HMSTD display controller is able to blend (e.g. to fuse) the different sensors data to generate or enhance specific features in the scenery according to predefined rules.

Figure 5A:
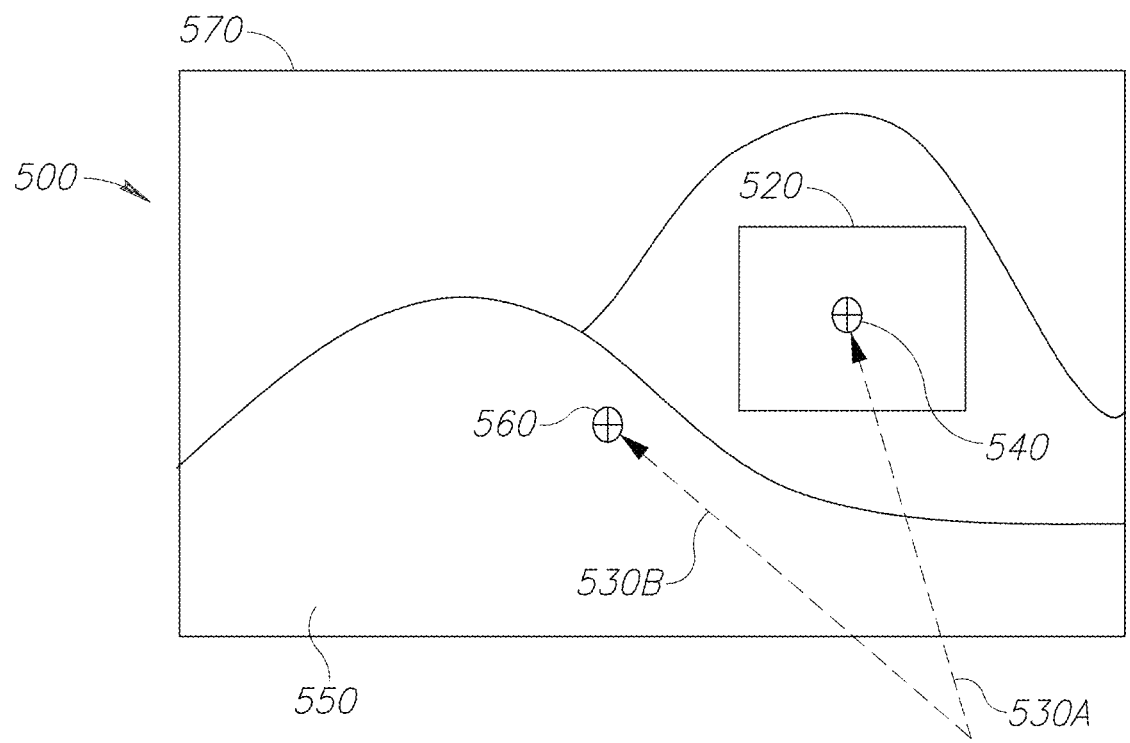
FIGS. 5A and 5B are high level schematic illustrations of use scenarios, according to some embodiments of the invention.
Figure 5B:
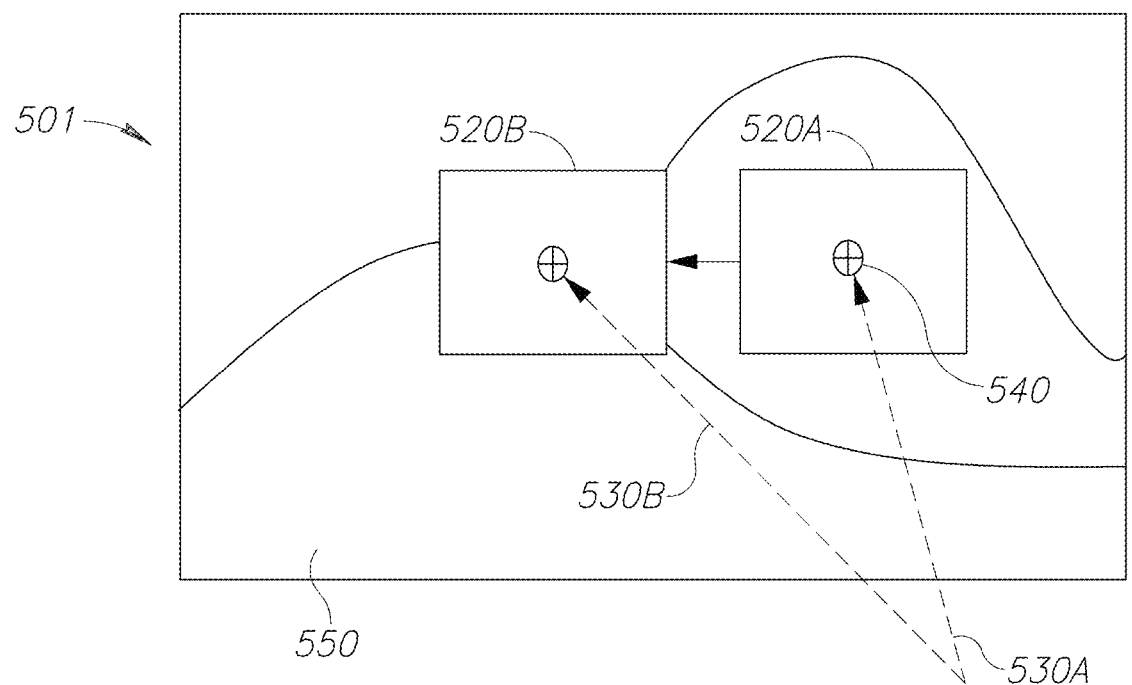

FIGS. 5A and 5B illustrates two different use scenarios where in case of FIG. 5A display area 520 may be locked in spatial position (locked means that area 520 maintains its position and orientation) related to earth coordinate system of reference according to desired point 540, any changes in the position of the HMSTD relative to desired point 540 may be compensated in size and shape of display area 520 in order to keep display area 520 in a fixed position relative to the desired point. Display area 520 may change size, shape and orientation according to the relative position and orientation between the HMSTD and the real coordinates of desired point 540 in the scene. Display area 520 may display a sensor data which is aligned to the synthetic data 550 displayed on display area 570, alignment between the synthetic data 550 and sensor data in display area 570 may be accomplished by rendering sensor data to match the size, orientation and magnification of objects in the scene as perceived from the HMSTD actual LOS. In another embodiment sensor data displayed in display area 570 may show a magnification/zoom of scene data inside area 570, the magnification may be selected according to predefined rules or may be adjusted using HMSTD LOS indication i.e. using HMSTD LOS 530A on specific objects inside display area 570 combined with a triggering mechanism (voice command, time threshold on object, and tactile event) may generate zoom process to a desired level or according to another triggering event which may indicate user desired zoom. To make the relation between trigger event and predefined rules clear it is to be understood that the triggering event together with the HMSTD LOS will generate a desired point on the scene and after a desired point is indicated the system will generate a second display area according to the relation between the predefined rules and the desired point. The predefined rules may be any of (but not limited to) size of second display area, shape of second display area, location of second display area positioned relative to the desired point, number of desired points needed in order to generate one second display are, priority of other data sources, fixed to a spatial point or floating according to HMSTD LOS.

In another embodiment FIG. 5B illustrates a case where display area 520A is movable or follows to a new position 520B according to the HMSTD LOS 790 movements from 530A to 530B, display area 520A may move continuously according to the actual HMSTD LOS tracked by the tracking arrangement or may be locked if the user indicates a new desired point as anchoring point in real earth coordinates. Display area 520A is free to move or rotate on axes according to tracked movements of HMSTD LOS on all tracked axes, or may move freely on only one axis according to one HMSTD tracked axes and locked on other axes to earth coordinates (i.e. display area may move according to HMSTD LOS movements on azimuth axes only and to be locked on elevation and roll to earth coordinates).

Figure 6:
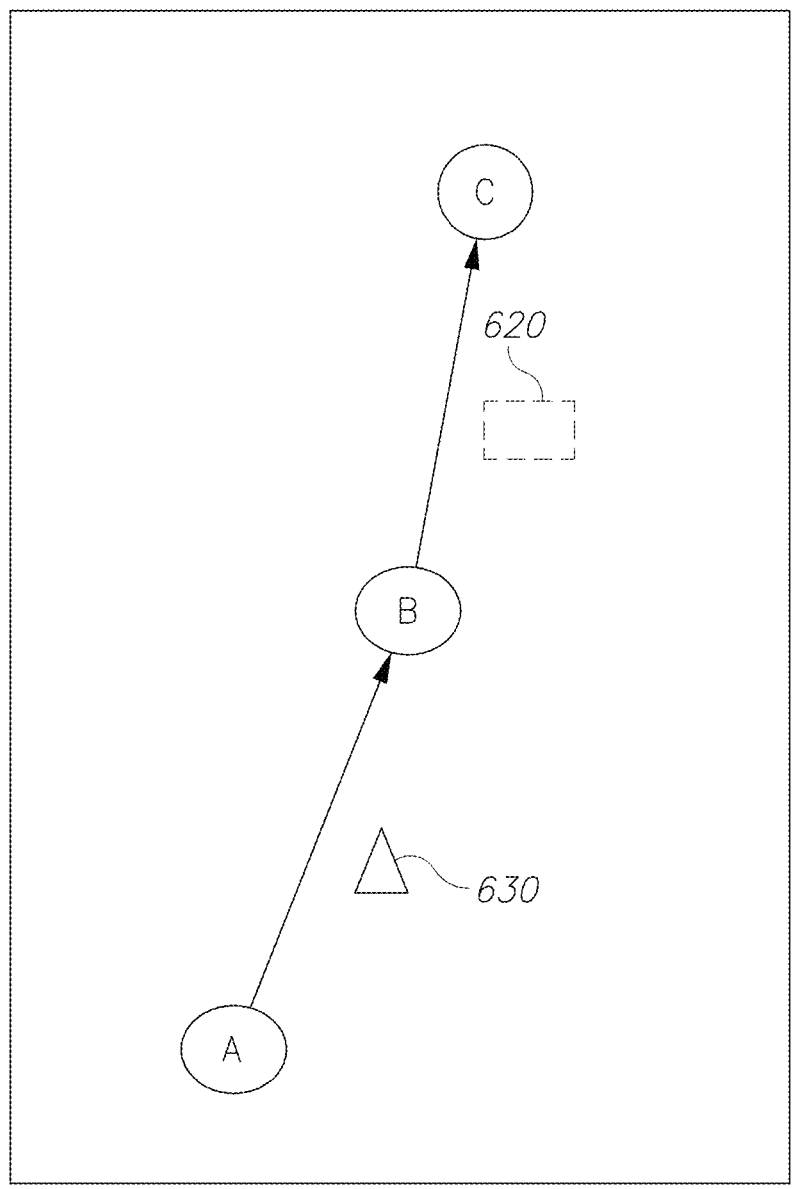
FIG. 6 is a high-level block diagram illustrating a system, according to some embodiments of the invention.

FIG. 6 reflects another use scenario where objects or ROI's may be pre-selected by a computer or a user along a desired route and according to HMSTD LOS may be displayed using sensor data viewing the area. In this case for sake of explanation we use flight plan of an aircraft, but it is understood that this scenario is valid for different types of vehicles land or airborne. Flight plan 601 indicates planned route of an aircraft from point A to C via way point B. User or CPU may select object of interest 630 along route A to B, In this case while flying from A to B as HMSTD LOS will intersect object of interest 630 HMSTD will display a sensor data or any other data representing the object instead of synthetic data or the real scenery as viewed from the window. In route from B to C user or CPU may select a region of interest (ROI) 620 in this case as the aircraft is getting closer to the area and HMSTD LOS intersects ROI 620, HMSTD will show sensor data viewing the area. Turning ON and OFF the sensor data to be displayed may be achieved using the HMSTD LOS and different types of thresholds such as: distance, angular range, height, velocity and other parameters of the HMSTD LOS and Vehicle parameters. In this scenario a predefined geo-location of a specific point in the scene may initiate the triggering event together with the HMSTD LOS to generate a second display area.

Figure 7:
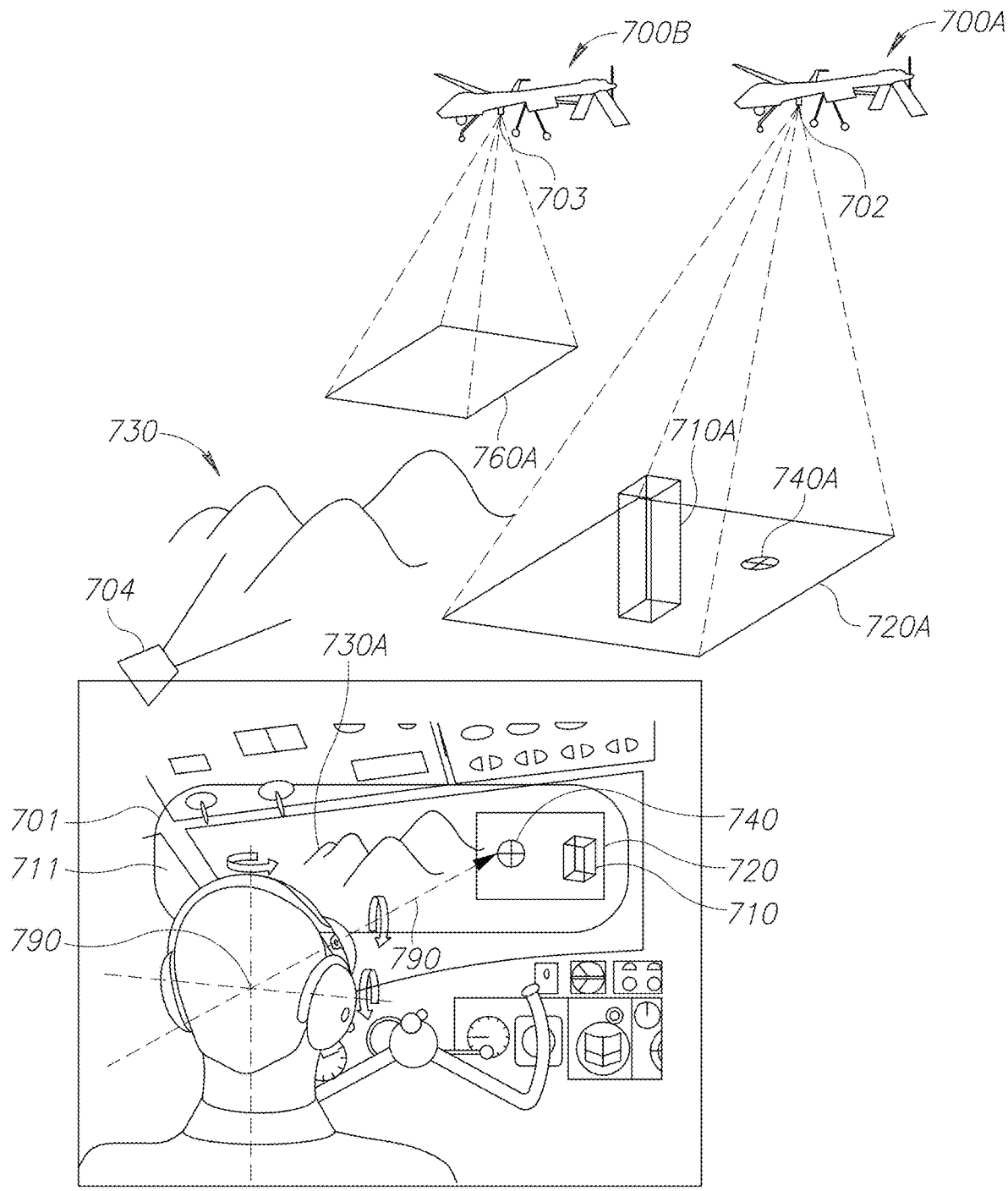
FIG. 7 is a high-level schematic illustrations of use scenario, according to some embodiments of the invention.

FIG. 7 refer to another use case according to the present invention, in this case user 790 wears HMSTD which may allow to display different type of data superimposed on the background scenery, the information as seen and displayed on HMSTD is illustrated in element 701 (element 701 is not the actual visor but for sake of explanations illustrates the data as if it was displayed on the HMSTD visor or other see through elements). Element 701 illustrates a first display area 711 which may show the actual background scene 730 User 790 may point HMSTD LOS 790 to a desired point 740 on background scene 730, desired point 740 may generate according to predefined rules a second display area 720 which may display a remote sensor 702 captured data. Remote sensor 702 capturing at least partially the area around desired point 740. Sensor 702 captured data may be rendered to the HMSTD LOS 790 or maintain its original orientation. Desired point 740 may be displayed as 740A to the remote sensor operator or may be indicated to a remote sensor controlling CPU, by displaying/indicating desired point 740A the remote sensor operator/CPU are to adjust the remote sensor field of view (FOV) 702 such that it will keep capturing the area around desired point 740/740A. Displaying sensor data in display area 720 defined by the HMSTD LOS 790 superimposed on the background may be a display such that display area 720 is view on the real area within another display area.

In case desired point 740 is not covered by any sensor a recorded data of that area may be presented to the HMSTD and a request for nearby sensors 702, 703 to adjust their position and their sensor FOV such that a real time sensor data may be delivered to the HMSTD in area 720 around desired point 740. In other cases where multiple sensors are covering desired point 740, HMSTD may show on element 701: sensor data according to a predefined priority, a fusion of the plurality of sensors, stereoscopic data. Remote sensor 702 FOV may be locked to the HMSTD desired point 740 such that it will maintain FOV 720A around or in other predefined spatial relation with desired point 740. Desired point 740 may be stationary or change its location according to HMSTD new LOS in the scenery in any case remote sensor 702 may lock its sensor FOV to stationary or moving desired point 740.

In another scenario mountain 730A may block a specific view of user 790, remote sensor 703 mounted on platform 700B capturing area 760A behind mountain 730A may display sensor data to reveal blocked scene area. Sensor data may be displayed fused on synthetic data to maintain situation awareness of HMSTD user.

Figure 8:
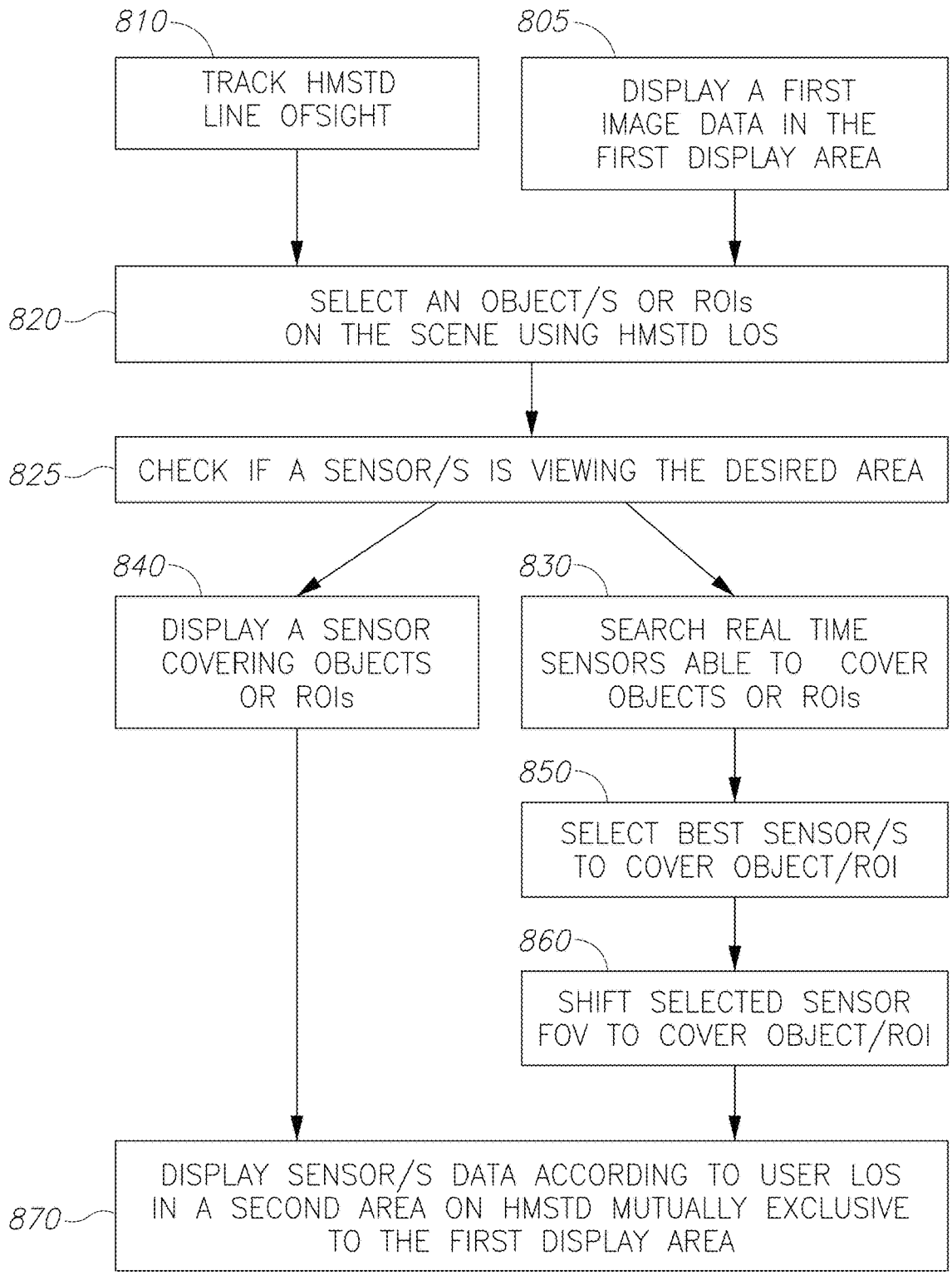
FIG. 8 is a high-level flowchart illustrating a method, according to some embodiments of the invention.

FIG. 8 is a high-level flowchart illustrating a method 800, according to some embodiments of the invention. Data processing stages of method 800 may be carried out at least partially by at least one processor.

Method 800 may comprise receiving or deriving a HMSTD line of sight (stage 810), the line of sight may be calculated by the HMSTD tracking arrangement or a remote tracker indicating the HMSTD position and orientation with respect to earth coordinates or at least the HMSTD orientation in platform coordinates. Method 800 may further display a first image data in a first display area of the HMSTD as indicated in stage 805, method 800 may further allow to select object or regions of interest in the scene using the HMSTD LOS (stage 820), following stage 820 the method may further check if the area of interest is covered by a sensor viewing the area or not (stage 825), in case at least one sensor is viewing the area HMSTD may display the sensor data according to user LOS in a second area on HMSTD mutually exclusive to the first display area (stage 870). In case no sensor is viewing the desired area stage 830 will search and find sensors which are most suitable and elected corresponding to at least one of: sensor position, sensor properties, sensor coverage, target properties, own platform location, spatial relation between platform and remote sensor, sensor time over target. Further to step 830 the method may search and find among the sensors able to cover the desired area the best sensor to view the desired point (stage 850) and may shift the selected sensor FOV to cover the desired object or ROI (stage 860) and display sensor/s data according to user LOS in a second area on HMSTD mutually exclusive to the first display area (stage 870).

Figure 9:
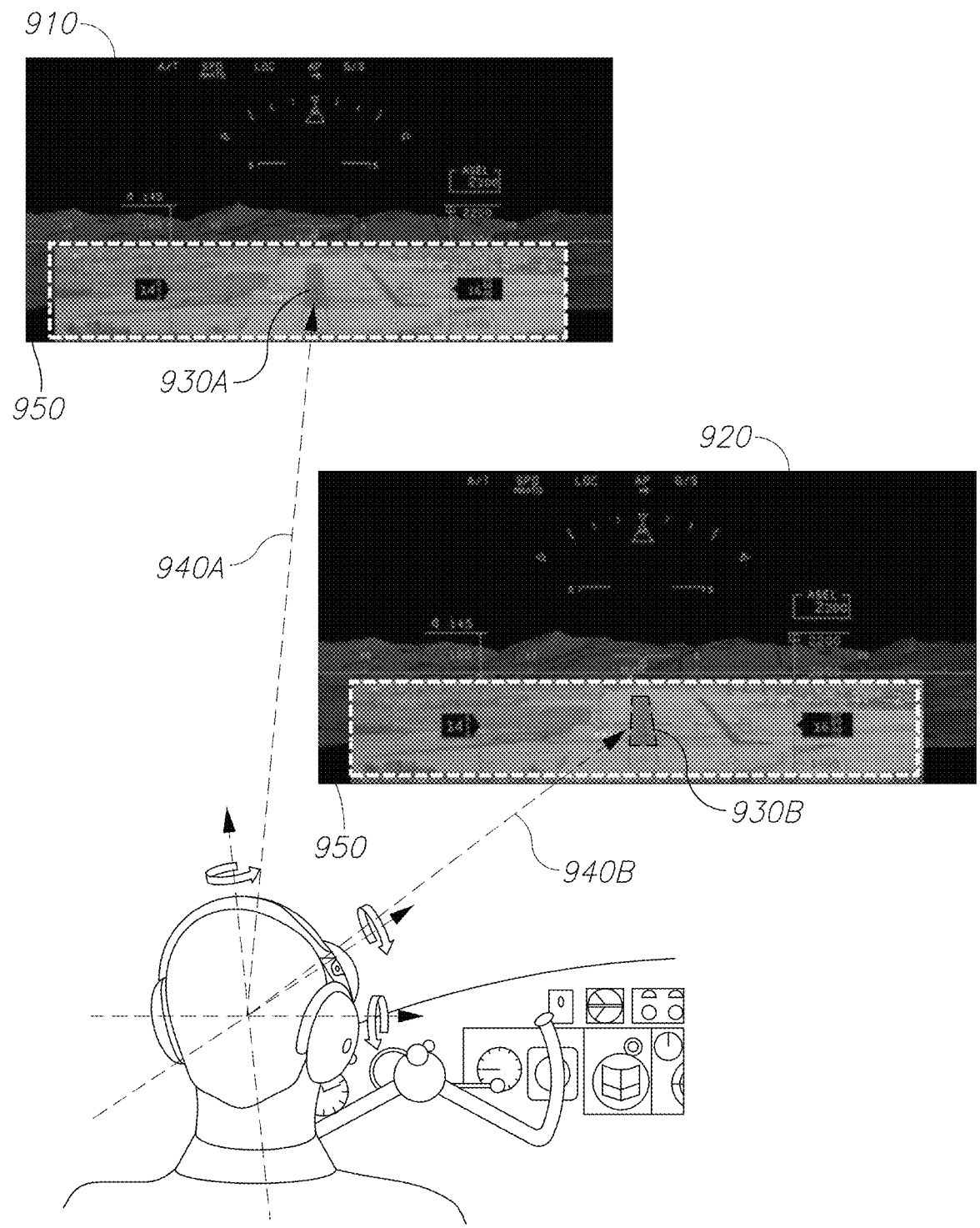
FIG. 9 is a high-level schematic illustrations of use scenario, according to some embodiments of the invention.

FIG. 9 is high level schematic illustrations of use scenario, according to some embodiments of the invention. A first display area 910 and a second display area 950 were created using the HMSTD LOS 940A as was detailed in different cases above, second display area 950 may display a sensor image data. In further embodiment HMSTD LOS 940B may indicate an object of interest 930A (runway) on second display area 950 doing do a synthetic data 930B conformal to the object of interest 930A may be displayed inside second area 950. In this embodiment using the HMSTD LOS to generate multiple areas of display allows further to fuse synthetic data and sensor data in both area according to HMSTD LOS desired.

Figure 10:
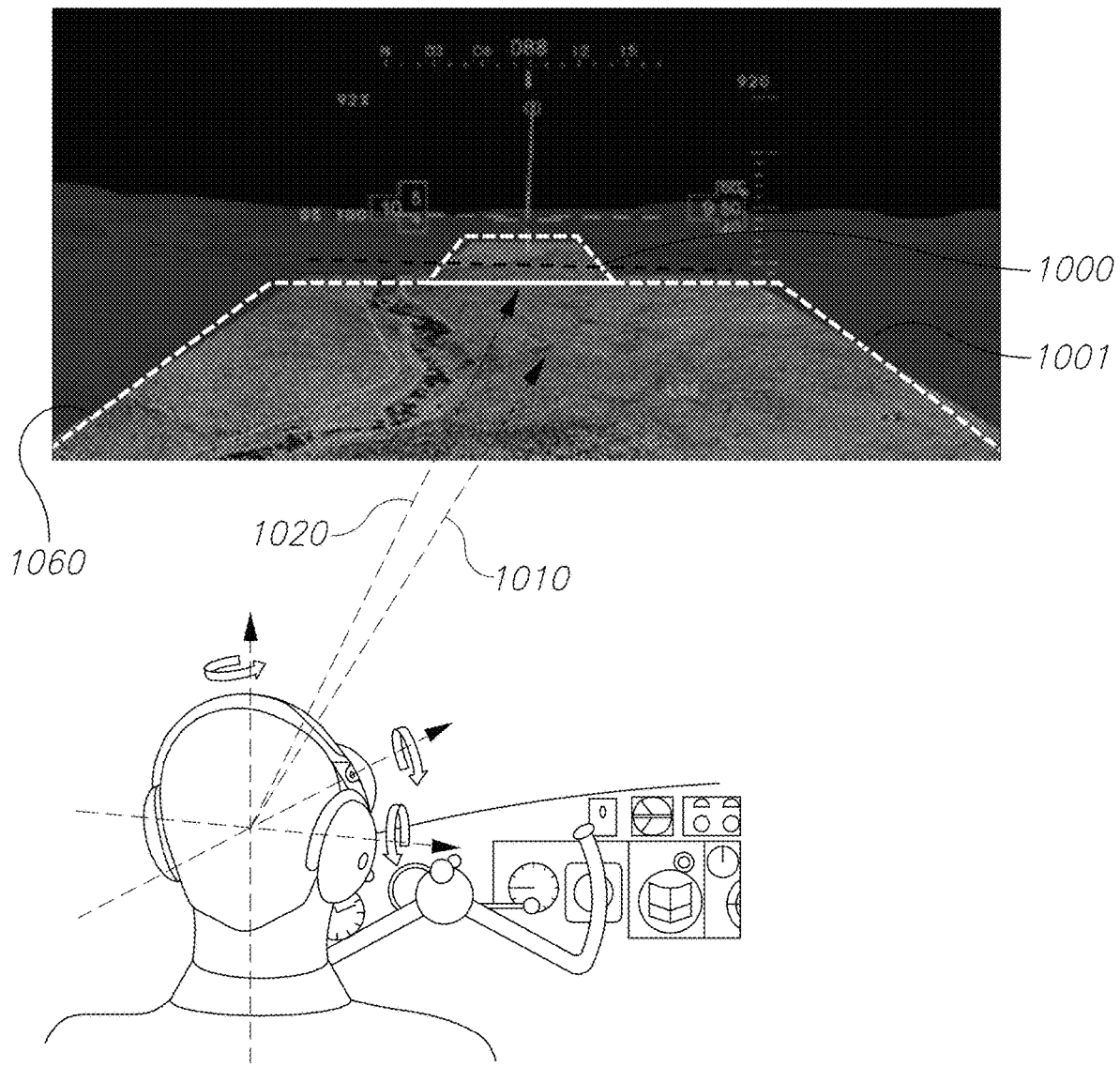
FIG. 10 is a high-level schematic illustrations of use scenario, according to some embodiments of the invention.

FIG. 10 is high level schematic illustrations of use scenario, according to some embodiments of the invention. Second display area 1001 was generated using HMSTD LOS 1010 on a first display area 1060. Vector 1020 is the vehicle heading vector (in case of an aircraft the flight path vector—FPV) may indicate where to generate a third display area 1000 which may be an extension of the second display area 1001. Adding the third display area 1000 may support the situation awareness of the HMSTD user and may show sensor data look ahead according to the specific vector. The vector may be any pre-defined vector such as a runway approach vector flight path vector, navigation route vector. In case of a flight plan/navigation route the vector may be the entire route which may generate a "corridor" of a sensor data along the flight route in the second display area.

Figure 11:
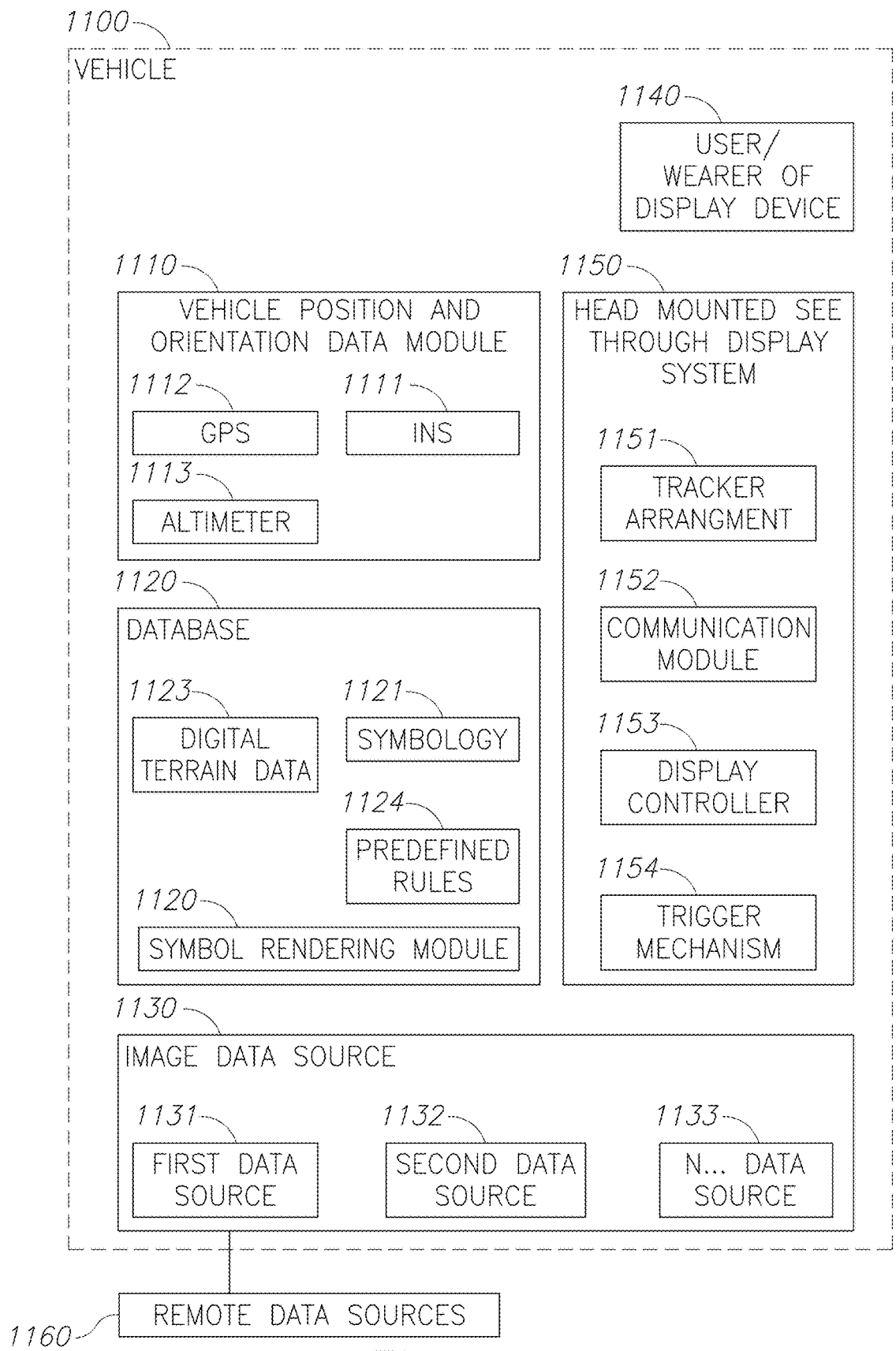
FIG. 11 is a high-level block diagram illustrating a system, according to some embodiments of the invention.

FIG. 11 is a block diagram illustration detailing one embodiment of implementing a system for displaying combined image data sources installed on a vehicle 1100. Vehicle 1100 may include a vehicle position and orientation data module 1110 for deriving real time information on the vehicle position and orientation in earth coordinates or in a fixed reference frame, the data module 1110 may include own vehicle GPS 1112, INS 1111 (inertial navigation system) devices installed on the vehicle or a specific position and orientation data module dedicated to track vehicle pose (position and orientation). it is understood that knowing the vehicle position and orientation may be determined using other sensors such as optical sensors, magnetic sensors and others.

Head-mounted see-through display 1150 worn by user 1140 may include a tracker arrangement 1151 for tracking the HMSTD line of sight in earth coordinates. Tracking the HMSTD position and orientation could be in reference to the vehicle coordinate system or in earth coordinates system. The line of sight driven from the HMSTD tracker arrangement 1151 indicating the desired point on the outside scene in earth coordinates system allows to designate a point on the real outside scene. The line of sight may be considered as a vector with the HMSTD as a starting point and the end point at the intersection of the vector and the digital terrain data (3D model of the scene). Display controller 1153 of the HMSTD may display a first display area projecting overlay of a synthetic image data conformal to the outside scene according to the tracked line of sight driven by the tracker arrangement 1151. A trigger mechanism 1154 may receive HMSTD line of sight and an indication of a user and/or CPU to initiate the desired point calculations. The triggering mechanism may be initiated by any one of triggering events such as: voice command, tactile event, time threshold of LOS on a specific point, specific head movements, eye blinking, image correlation to recognize desired objects on scene (runways, buildings and other predefined objects of interest), predefined geo-location, any of triggering events may initiate calculation of a desired point on the outside scene using the line of sight of the HMSTD and the vehicle parameters (altitude, velocity, attitude).

Display controller 1153 may define a second display area on the HMSTD positioned relative to the desired point and according to the predefined rules. The second display area may contain data driven from image data source 1130 such as first data source 1131 to N data source 1133 received from the vehicle own sensors mounted on the vehicle. The second display area may contain data driven from a remote data source 1160 (such as sensor mounted on drone 700A but not limited to). The second display area may contain a data rendered to the HMSTD line of sight or according to a user request change to a different view vector which is not the line of sight of the HMSTD. The system in some embodiments may be designed in one module or separated to independent modules forming the system. The system may display a combined image data sources derived from 1130 or 1160 on a head-mounted see-through display (HMSTD) and may comprise a tracker arrangement 1151 used for tracking the HMSTD line of sight. a display controller 1153 is further adapted to display a first display area with a synthetic image data overlaid conformal on an outside scene and a trigger mechanism 1154 may be adapted to indicate a desired point on said outside scene based on HMSTD line of sight and a triggering event. The display controller is further configured to receive the desired point and to define a second display area on the HMSTD positioned relative to the desired point and the predefined rules stored in 1124. The second display area contains at least one other data which may be derived from 1130 or 1160 such as sensor data viewing the scene. The HMSTD is further adapted to display simultaneously first and second display areas. The other data may be a sensor data viewing at least partially said desired point such as first data source 1131 on vehicle 1100 or may be derived from a remote sensor 1160 located remotely from the vehicle (not on the vehicle). The second display area properties may be selected from a predefined rules or may further be selected in real time according to the user demand, for example the size or shape of the second display area (some of the properties) may be selected in real time based on HMSTD LOS or other user input devices. The second display area properties may be defined based on predefined rules selected from the list of: size, shape, location relative to said desired point, number of desired points needed in order to generate said second display area, priority of other data sources stored in 1124. The second display area may be locked to a spatial location in an earth coordinate system of reference based on said desired point or may follow said HMSTD line of sight and changes its position accordingly. The trigger mechanism 1154 may indicate a desired point on said outside scene based on at least said HMSTD line of sight and a triggering event. The triggering event may be one of: Voice command, Time threshold, Tactile event, Image correlation, Predefined geo-location. The time threshold indicates if the HMSTD LOS is continuously designating one desired point above a predetermined time duration this threshold may indicate that a triggering event has occurred. The desired point may be an intersection of HMSTD line of sight in earth coordinate system and a terrain elevation map (DTED/DTM). Display controller 1153 is further adapted to display the desired point on the HMSTD as a synthetic symbol overlaid on said outside scene. The other data such as the sensor data but not limited to may be rendered to the HMSTD line of sight perspective before displaying it in the second display area. The HMSTD line of sight is further configured to indicate an object inside the second display area (such as a runway) and the display controller may be configured to display the object as a synthetic data in the second display area.

As will be appreciated by one skilled in the art, aspects of the present invention may be embodied as a system, method or an apparatus. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system".

The aforementioned flowchart and block diagrams illustrate the architecture, functionality, and operation of possible implementations of systems and methods according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions. It will further be recognized that the aspects of the invention described hereinabove may be combined or otherwise coexist in embodiments of the invention.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention.

The invention claimed is:

1. A system for displaying conformal synthetic data on a scene over a head-mounted see-through display (HMSTD) having a line of sight (LOS), the system comprising:
   a tracker configured to track the LOS of the HMSTD;
   a display controller configured to display on the HMSTD
      a first display area comprising a synthetic image data conformal to a scene viewed from the HMSTD;
   wherein said display controller is configured to receive a desired point being a point within the scene which intersects the LOS of the HMSTD and to display a second display area on said HMSTD, wherein the second display area is positioned relative to said desired point,
   wherein said synthetic image data is displayed over the HMSTD at a reduced intensity on an overlap area between the first and the second areas.

2. The system of claim 1, wherein said reduced intensity on an overlap area between the first and the second areas creates a hole inside the first display area such that the scene may be seen directly through the hole.

3. The system of claim 1, wherein said synthetic image data in a portion of said first display area further comprises projecting a sensor data.

4. The system of claim 3, wherein said sensor data is rendered to HMSTD line of sight perspective before display in said second display area.

5. The system of claim 3, is further configured to search and find the said at least one sensor data most suitable for said desired point.

6. The system of claim 5, wherein said most suitable sensor data is elected corresponding to at least one of: sensor position, sensor properties, sensor coverage, target properties, own platform location, spatial relation between platform and remote sensor, sensor time over target.

7. The system of claim 1, wherein said sensor data is derived from a remote sensor.

8. The system of claim 1, wherein said desired point indicates a second display area properties.

9. The system of claim 8, wherein said second display area properties are defined based on predefined rules selected from at least one of: size, shape, location relative to said desired point, number of desired points needed in order to generate said second display area, priority of other data sources.

10. The system of claim 1, wherein said second display area is locked to a spatial location in an earth coordinate system of reference based on said desired point.

11. The system of claim 1, wherein said second display area follows said line of sight and changes its position accordingly.

12. The system of claim 1, wherein said tracker is further configured to track line of sight of said HMSTD with respect to an earth coordinate system.

13. The system of claim 1, wherein said desired point is an intersection of said HMSTD line of sight in said earth coordinate system and a terrain elevation map.

14. The system of claim 1, wherein said display controller is further adapted to display said desired point on said HMSTD as synthetic symbol overlaid on said scene.

15. The system of claim 1, wherein said second display area is adjusted corresponding to a vector indicating the heading of the HMSTD.

16. The system of claim 1, wherein said HMSTD line of sight is further configured to indicate an object inside said second display area, wherein said display controller is further configured to display said object as a synthetic data in said second display area.

17. A method of displaying conformal synthetic data on a scene over a head-mounted see-through display (HMSTD) having a line of sight (LOS), the method comprising:
   tracking the LOS of the HMSTD;
   displaying on the HMSTD a first display area comprising a synthetic image data conformal to a scene viewed from the HMSTD;
   receiving a desired point being a point within the scene which intersects the LOS of the HMSTD; and
   displaying a second display area on said HMSTD, wherein the second display area is positioned relative to said desired point, wherein said synthetic image data is displayed over the HMSTD at a reduced intensity on an overlap area between the first and the second areas.

18. The method of claim 17, wherein said reduced intensity on an overlap area between the first and the second areas creates a hole inside the first display area such that the scene may be seen directly through the hole.

19. The method of claim 17, wherein said synthetic image data in a portion of said first display area further comprises projecting a sensor data.

20. The method of claim 17, wherein said sensor data is derived from a remote sensor.

* * * * *